United States Patent [19]

Mastain et al.

[11] Patent Number: 4,480,311
[45] Date of Patent: Oct. 30, 1984

[54] DIGITAL RADIATION DOSEMETER HAVING AN OPTOELECTRONIC TRANSMITTER

[75] Inventors: Pierre Mastain, Salons de Provence; Alain Pailhès, Lamanon, both of France

[73] Assignee: Gerin Merlin, Grenoble, France

[21] Appl. No.: 275,938

[22] Filed: Jun. 22, 1981

[30] Foreign Application Priority Data

Jul. 1, 1980 [FR] France .................... 80 14703

[51] Int. Cl.³ ............................................. G01T 1/16
[52] U.S. Cl. ............................ 364/527; 250/388; 340/600; 364/414; 364/555; 377/19; 377/38; 377/53
[58] Field of Search ........ 364/419, 527, 556, 413–415, 364/555; 377/19, 38, 42, 53, 55, 56; 340/600; 250/388; 455/606, 613, 602

[56] References Cited

U.S. PATENT DOCUMENTS

| | | | |
|---|---|---|---|
| 3,578,960 | 5/1971 | Georgi | 364/527 |
| 3,825,896 | 7/1974 | Obenhaus | 455/602 |
| 3,878,496 | 4/1975 | Erickson | 250/388 X |
| 4,092,538 | 5/1978 | Boux | 364/414 X |
| 4,201,907 | 5/1980 | Otten | 377/38 |
| 4,298,839 | 11/1981 | Johnston | 455/602 X |
| 4,301,367 | 11/1981 | Hsu | 340/600 X |

OTHER PUBLICATIONS

"Inductive Coil Used to Charge Batteries and Read Out Data From $170 Dosimeter," *Electronics*, (Jan. 20, 1977), pp. 8E, 10E.

*Primary Examiner*—Errol A. Krass
*Attorney, Agent, or Firm*—Parkhurst & Oliff

[57] ABSTRACT

This invention relates to a digital radiation dosemeter comprising a detector (12) converting the ionizing radiation to electrical impulses and an electronic survey device (14) for the storage of said impulses in a dose radiation counter (18). An optoelectronic transmitter (34, 38, 40) sends the informations to an external data processing system. A binary counter (42) operates said transmitter and cooperates with a reading control circuit (43) including a photosensitive receiver (44) connected in series with a magnetic reed switch (46).

3 Claims, 4 Drawing Figures

DIGITAL RADIATION DOSEMETER HAVING AN OPTOELECTRONIC TRANSMITTER

BACKGROUND OF THE INVENTION

This invention relates to devices for measuring atomic radiation, and in particular those for measuring ambient ionizing radiation. These devices are commonly known as dosemeters.

With the advent of numerous atomic energy programs, there has been a need for an accurate method of determining the amount of radiation an individual is exposed to. Electronic dosemeters have been developed which measure the accumulate dose of radiation. The transmitters of these digital radiation dosemeters are usually equipped with a capacitive link or with mechanical contacts for transmission to some external data processing system. Capacitive links or mechanical contacts are not satisfactory connectors to a processing system as the transmitter is affected by stray radiation which may cause unwanted transmitting signals.

It is therefore an object of this invention to provide an improved radiation dosemeter which eliminates the problems of stray radiation in the prior art types.

Another object of the present invention is to provide a portable radiation dosemeter made from conventional components.

SUMMARY OF THE INVENTION

In practicing this invention a personal pocket dosemeter is provided which uses a detector to convert the ionizing radiation to electrical signals. An electronic survey device stores the electrical signals, usually impulses, in a dose radiation counter. A display device connected to a dose radiation counter is used to indicate a visual instantaneous representation of the integral dose stored in the dose radiation counter. A transmitter then sends the information of the dose radiation counter to some external data processing system upon automatic reading of the dosemeter. An opto-electric device is used to transmit information from the dose radiation counter to the data processing system thus eliminating the need for a capacitive link or mechanical contacts.

BRIEF DESCRIPTION OF THE DRAWINGS

The present invention, as well as further objects and advantages thereof, may be more fully understood from the following detailed description of preferred embodiments in conjunction with the drawing in which:

Referring to FIGS. 1 and 2, the dosemeter 10 comprises a radiation detector 12 associated with an electronic survey and display device 14 for measuring the ionizing radiation dose. The detector 12 converts radiation flux to electrical signals suitable for observation and measurement. The frequency of these signals varies with the intensity of radiation. The electronic survey and display device 14 includes a programming frequency divider 16 which calibrates the output signals of detector 12 before their injection in a radiation counter 18. A radiation dose of one millirad corresponds to n signals delivered by detector 12, and the integral dose is stored in the radiation counter 18. An optoelectronic display device 20 indicates a visual and numerical representation of the integral dose stored in said radiation counter 18. An instantaneous direct reading of the dose is thus possible by the operator who carries the dosemeter 10. The frequency divider 16 is further connected to a control device 22 of an electroluminescent diode 24 which emits a flashing signal for each dose corresponding to a tenth of millirad.

Figure 1:
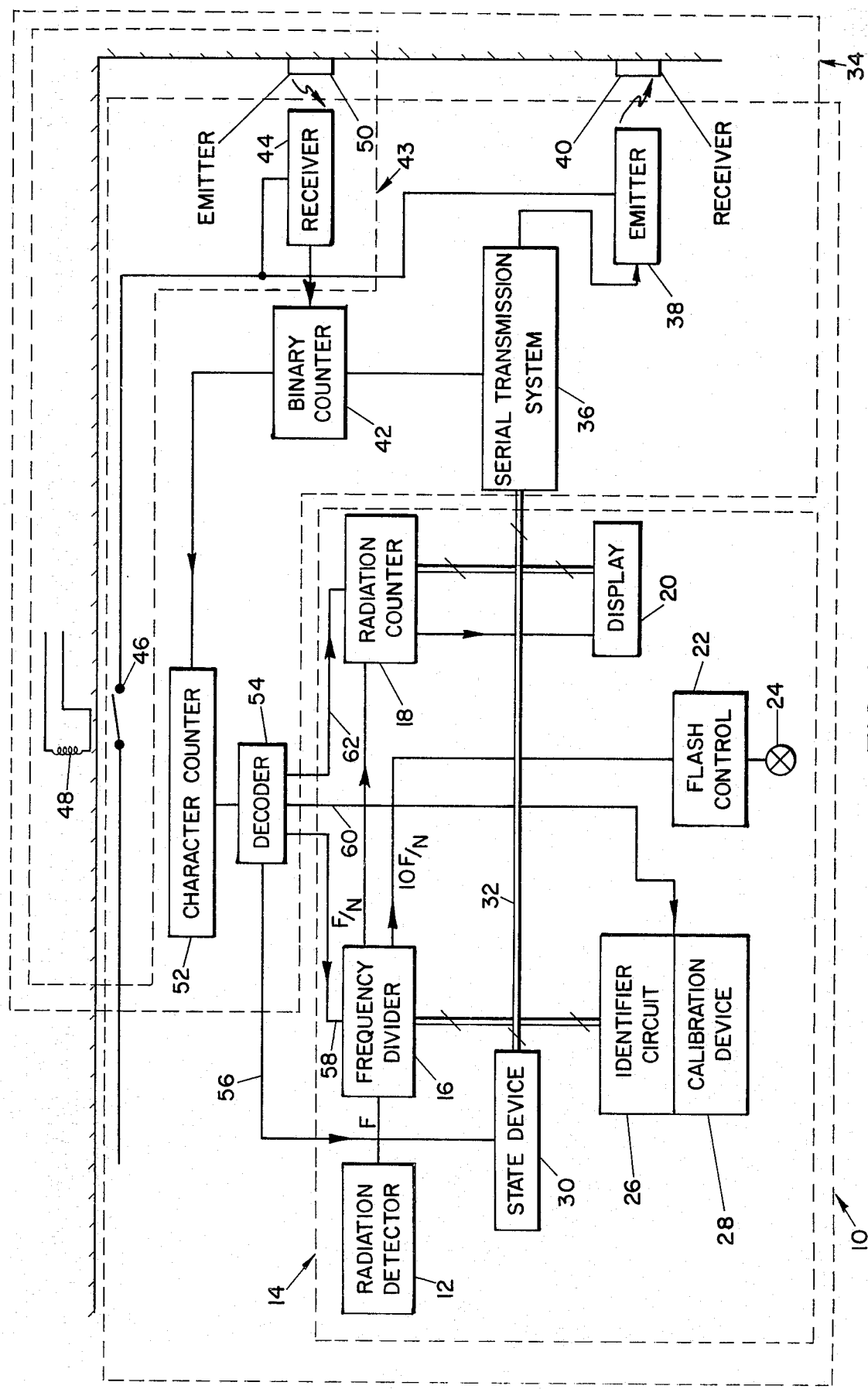
FIG. 1 is a block diagram of the digital radiation dosemeter embodying the invention.

An indicator number (identifying number) is sent to the dosemeter 10 by means of an identifier circuit 26 having an active element of six numbers adjusted upon assembling of the apparatus (from 000000 to 999999). A calibration device 28 comprising a programming memory, cooperates with divider 16 for changing the frequency of the output signals to a desired value according to the type of detector 12. A bus 32 serves as a common connection for the divider 16, the radiation counter 18, the digital display device 20, the identifier and calibration circuits 26, 28 and a device 30 which indicates the state of the dosemeter.

The dose stored within said radiation counter 18 and the indicator number of the dosemeter 10 are transmitted automatically to an external data processing system (not shown) when the person who carries the dosemeter reaches a predetermined zone, more particularly the input and output of a selected area. The processing system compiles the successive doses attributed to each person in a log-book.

The automatic reading of the dosemeter 10 is operated by means of a reproducing system including a measuring synchro-transmitter 34 cooperating with the survey device 14 so that the indication of the dose radiation counter 18, the indicator number and the state of the dosemeter are applied character by character on the bus 32. A serial transmission system 36 connected to bus 32 shifts the bits of each character towards an infrared radiation emitting device 38 such as a light emitting diode which cooperates with a transmitter receiver 40 of the processing system when the dosemeter 10 is located in a reading position. The optoelectronic device 38, transmits the digital pulses to the data processing system without mechanical contact or galvanic coupling.

A digital counter 42 which monitors the serial transmission system 36 is actuated by means of a reading control circuit 43 comprising an infrared receiver 44 connected in series with a magnetic reed switch 46 associated with a control coil 48. An infrared auxiliary emitter 50 of the synchro-transmitter 34 gives a reading order to the associated receiver 44. A character counter 52 which is operated by digital counter 42, is connected to a decoder 54 of the character number. The decoder 54 is connected by conductors 56, 58, 60, and 62 respectively to the state indicating circuit 30, the frequency divider 16, the identifier and calibration circuits 26, 28 and the dose radiation counter 18.

Figure 2:
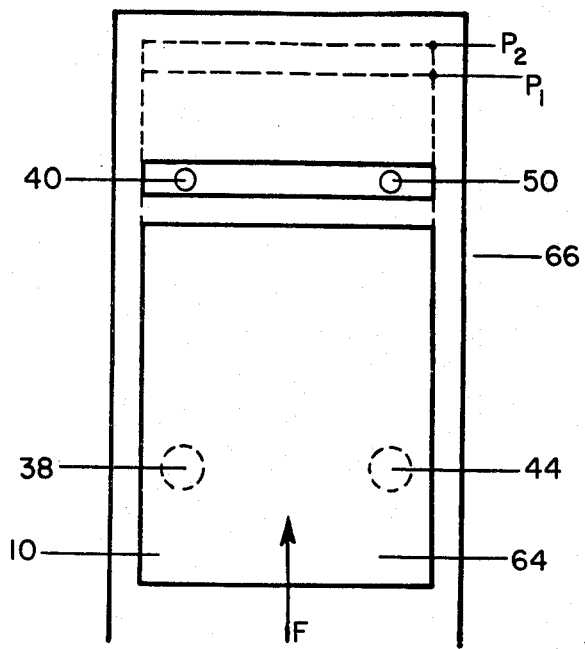
FIG. 2 shows the dosemeter inserted within a reading desk connected to the external data processing system.

One face of the housing 64 of the dosemeter 10 comprises appropriate openings allowing the working of the optoelectronic synchro-transmitter 34 when the dosemeter 10 is inserted within a reading desk 66 in the direction of arrow F (FIG. 2). The energization of coil 48 occurs when the dosemeter comes in an intermediate position $P_1$. The automatic reading of the dosemeter occurs later in end position $P_2$.

The operation of the survey device 14 equipped with the measuring synchro-transmitter 34 according to FIGS. 1 and 2 is as follows:

The dosemeter 10 which is carried by the person within the selected area, stores the integral dose in the radiation counter 18. The display device 20 indicates a visual representation of the dose.

At the input or output of the selected area, the person introduces the dosemeter in the reading desk 66 for the transmission of the informations to the external data processing system. The serial transmission system 36 and the decoder 54 are operative when the magnetic reed switch 46 is closed and when the stationary auxiliary emitter 50 sends from the reading desk 66 a control light beam to the infrared receiver 44 located on the dosemeter 10. The infrared emitter 38 and receiver 44 of the dosemeter 10 are energized when the reed switch 46 is closed.

The binary counter 42 is shifted by one step after each impulse delivered by the receiver 44. The decoder 54 applies each character on the bus 32 and the serial transmission system 36 cooperates with the counter 42 so as to shift the bits of each character to the emitting device 38 for the transmission of the number stored in the dose radiation counter 18 and the indicator number of the dosemeter 10 to the external processing system.

The dose radiation counter 18 may be reset to zero from the reading desk 66 by means of the auxiliary emitter 50 cooperating with the associated receiver 44.

Figures 3, 4:
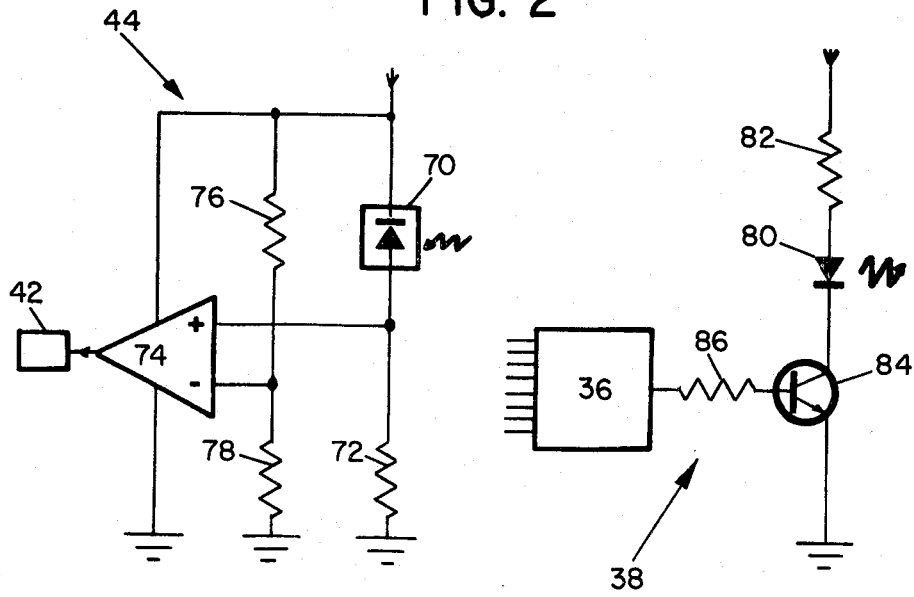
FIG. 3 shows the electrical circuit of the photosensitive receiver arranged in the reading control circuit.
FIG. 4 shows the electrical circuit of the infrared emitting device which sends the information to the processing system.

FIG. 3 shows the infrared receiver 44 of the dosemeter 10 comprising a photodiode 70 having a cathode which is connected to the supply and an anode connected to a grounded resistor 72. A differential amplifier 74 produces output signals applied to counter 42 in response to a potential difference between its input terminals connected respectively to resistor 72 and to a resistor divider 76 and 78.

As illustrated in FIG. 4, the infrared emitting device 38 comprises a light emitting diode 80, the anode of which is connected to the supply via a resistor 82. The cathode of diode 80 is connected to the collector of a transistor 84 and the information of the serial transmission system 36 are applied to the base of transistor 84 via a resistor 86.

The present invention having been described in connection with specific embodiments thereof, it is to be understood that the description herein is intended only as illustrative of the principal features of the invention.

What is claimed is:

1. A radiation detecting system for monitoring ambient ionizing radiation and including a dosemeter retained within a housing and a data processing system external to said housing and constructed to receive said dosemeter for initiating and receiving data from said dosemeter, wherein the improvement in said dosemeter comprises:

radiation detector means for detecting ionizing radiation and for producing electrical signals in response to said radiation;

electronic survey means including a dose radiation counter responsive to said electrical signals for counting and storing a count representing the instantaneous value of the detected dose of radiation;

an identifier circuit means for providing an identifying number for the dosemeter;

main data bus means coupled to said identifier circuit means and said electronic survey means for transmitting said stored count and said identifying number;

serial data transmission means coupled to receive said stored count and said identifying number for providing serial binary data representing said stored count and said identifying number;

first opto-electronic transmitter means coupled to receive said serial binary data and responsive to a control signal for transmitting said serial binary data;

first photosensitive receiver means responsive to said control signal for receiving a read command from said data processing system;

binary control means responsive to said first photosensitive receiver means and coupled to said serial data transmission means to initiate said providing of said serial binary data;

electrical switch means coupled to said first photosensitive receiver means and said first opto-electronic transmitter means for producing said control signal when actuated, and wherein the improvement in said data processing system comprises;

means for receiving said dosemeter at a predetermined position with respect to said data processing system;

second opto-electronic transmitter means positioned to transmit a read command to said first photosensitive receiver means when said dosemeter is in said predetermined position;

second photosensitive receiver means positioned to receive transmitted serial binary data from said first opto-electronic transmitter means when said dosemeter is positioned in said predetermined position for reading said stored count and said identified number; and means responsive to said dosemeter being in said predetermined position for actuating said electrical switch means to enable initiation of a read command from said second opto-electronic transmitter means and to cause transmission of said serial binary data to said second photosensitive receiver means for reading of said stored count and said identifying number by said data processing system.

2. A radiation detection system for monitoring radiation and including a dosemeter and a data processing system coupled to receive said dosemeter to read information from said dosemeter, wherein the improvement in said dosemeter comprises:

means responsive to radiation for producing electrical signals representing said radiation;

means for counting said electrical signals and providing a stored count representing measured radiation;

means coupled to receive said stored count for providing serial binary data representing said stored count;

means responsive to a control signal for optically transmitting said serial binary data;

means responsive to said control signal for receiving an optical read signal;

means responsive to said optical read signal for initiating transmission of said serial binary data; and switch means coupled to provide said control signal when actuated; and wherein the improvement in said data processing system comprises:

means responsive to a predetermined position of said dosemeter with respect to said data processing system for actuating said switch means;

means for transmitting an optical read command following actuation of said switch means; and means for receiving said optically transmitted serial binary data following actuation of said switch means to read said stored count.

3. A radiation detecting system for monitoring ambient ionizing radiation and including a dosemeter retained within a housing and a data processing system external to said housing and constructed to receive said dosemeter for initiating and receiving data from said dosemeter, wherein the improvement in said dosemeter comprises:

radiation detector means for detecting ionizing radiation and for producing electrical signals in response to said radiation;

electronic survey means including a dose radiation counter responsive to said electrical signals for counting and storing a count representing the instantaneous value of the detected dose of radiation;

main data bus means coupled to said electronic survey means for transmitting said stored count;

serial data transmission means coupled to receive said stored count for providing serial binary data representing said stored count;

first opto-electronic transmitter means coupled to receive said serial binary data and responsive to a control signal for optically transmitting said serial binary data;

first photosensitive receiver means responsive to said control signal for receiving a read command from said data processing system;

binary control means responsive to said first photosensitive receiver means and coupled to said serial data transmission means to initiate said providing of said serial binary data;

electrical switch means coupled to said first photosensitive receiver means and said first opto-electronic transmitter means for producing said control signal when actuated, and wherein the improvement in said data processing system comprises;

means for receiving said dosemeter at a predetermined position with respect to said data processing system;

second opto-electronic transmitter means positioned to transmit a read command to said first photosensitive receiver means when said dosemeter is in said predetermined position;

second photosensitive receiver means positioned to receive transmitted serial data from said dosemeter when positioned in said predetermined position for reading said stored count; and means responsive to said dosemeter being in said predetermined position for actuating said electrical switch means to enable initiation of a read command from said second opto-electronic transmitter means and to cause transmission of said serial binary data to said second photosensitive receiver means for reading of said stored count by said data processing system.

* * * * *